No. 660,598. Patented Oct. 30, 1900.
C. H. STONEBRIDGE.
BICYCLE TENDER.
(Application filed Jan. 29, 1900.)
(No Model.)
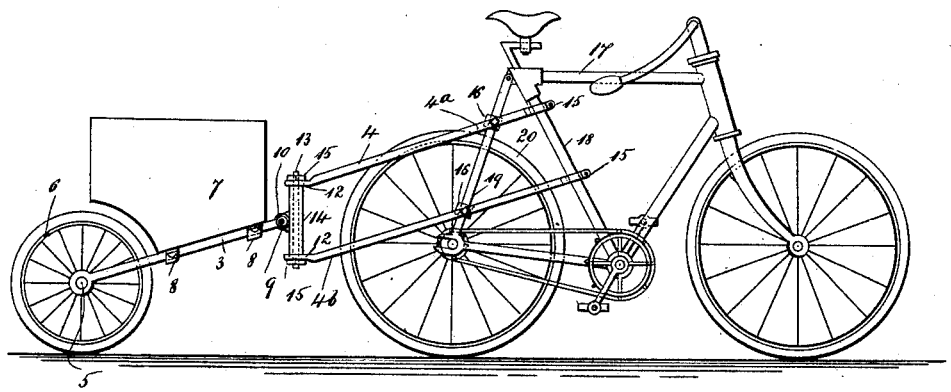
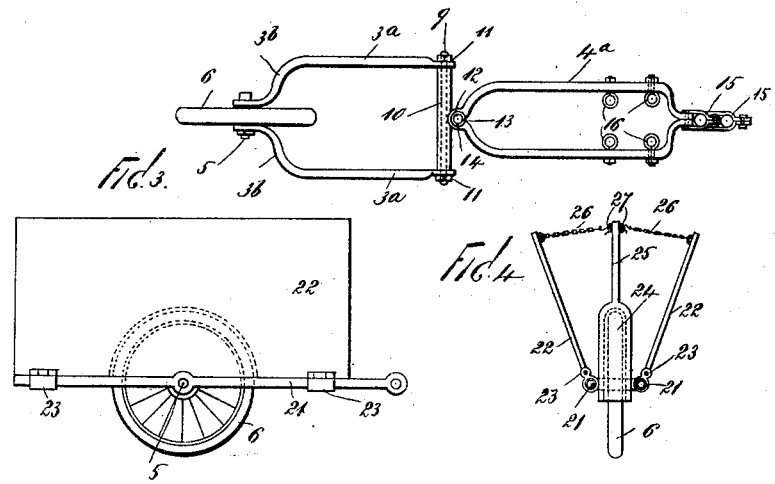
WITNESSES
John Buckler,
F. A. Stewart.
INVENTOR
Charles H. Stonebridge
BY
Edgar Tate & Co.
ATTORNEYS

UNITED STATES PATENT OFFICE.

CHARLES H. STONEBRIDGE, OF NEW YORK, N. Y.

BICYCLE-TENDER.

SPECIFICATION forming part of Letters Patent No. 660,598, dated October 30, 1900.

Application filed January 29, 1900. Serial No. 3,106. (No model.)

*To all whom it may concern:*

Be it known that I, CHARLES H. STONEBRIDGE, a citizen of the United States, residing at New York, in the county of New York and State of New York, have invented certain new and useful Improvements in Bicycle-Tenders, of which the following is a full and complete specification, such as will enable those skilled in the art to which it appertains to make and use the same.

This invention relates to bicycle-tenders; and the object thereof is to provide a tender for bicycles and similar vehicles of the class described which may be readily attached to and detached from the bicycle and which shall have independent lateral and vertical movements.

With this and other objects in view my invention consists in the construction and arrangement of parts hereinafter specified.

In the accompanying drawings, forming part of this specification, in which like reference characters denote corresponding parts in the several views, Figure 1 is a side elevation of a bicycle and a tender connected therewith and constructed according to my invention; Fig. 2, a plan view of the tender-frames and support-wheel, and Figs. 3 and 4 are respectively a side and end elevation of a modified form of tender construction.

In the practice of my invention I provide a tender embodying a main frame 3 and a supplemental frame 4. The main frame 3 consists of side members $3^a$, the rearward ends of which are curved convergently and connected by a spindle 5, upon which is mounted a support-wheel 6, in the customary or any desired manner.

Upon the side members 3 is supported the tender-body 7, the rearward under portion of which is cut away segmentally, following the curve of the wheel 6 and serving as a mud-guard for said wheel. The body portion 7 is connected with the member $3^a$ by means of clamps 8 or in any other suitable manner. The forward ends of the side members $3^a$ are connected by a spindle 9, which is passed revolubly through a sleeve 10 and retained in place by nuts 11. The sleeve 10 is arranged horizontally, as shown in the drawings.

The supplemental frame 4 consists of two parallel members—an upper and lower, respectively—$4^a$ and $4^b$, and each of which is loop-shaped, being provided at its rearmost end with a head 12. Through the heads 12 is passed a spindle 13, which is also passed revolubly through a sleeve 14 and secured rigidly to the heads 12 by nuts 15. The sleeve 14 is arranged vertically or at right angles with the sleeve 10 and is rigidly secured thereto. The forward end of each of the members $4^a$ and $4^b$ is provided with a clamp $15^a$. Each of the loop-shaped supplemental frame members $4^a$ and $4^b$ is provided at a predetermined point at each side with a clamp 16, and the clamps $15^a$ and 16 may be of any desired and adapted form.

In Fig. 1 I have denoted by the general reference character 17 a bicycle of standard form which embodies in its frame construction an upwardly and rearwardly ranging member 18 and upwardly and forwardly ranging members 19, which are directed convergently with relation to said member 18. The relative arrangement of the members $4^a$ and $4^b$ and the clamps $15^a$ and 16, connected therewith, is such that the clamps $15^a$ may be engaged with the member 18 and the clamps 16 with the members 19, the loop-shaped members $4^a$ and $4^b$ inclosing the drive-wheel 20 of the bicycle 17. As the members 18 and 19 of the frame of the bicycle converge upwardly, the clamps need not be rigidly connected with the frame; but even a loose connection thereof will prevent the downward slipping of the members $4^a$ and $4^b$. The double connection of the members $4^a$ and $4^b$ with the bicycle-frame prevents lateral play or pivotal movement of the supplemental frame 4, and it is manifest that the sleeve 14 is maintained firmly in a vertical position while the sleeve 10 is maintained in fixed horizontal position.

By means of the turnable mounting of the spindle 13 in the sleeve 14 the tender main frame 3 is provided with a lateral play, and by means of the turnable mounting of the spindle 9 in the sleeve 10 the frame 3 is provided with a vertical play, and hence the bicycle and tender are respectively unaffected by the movements of the other due to unevenness of road-bed. The arrangement and connection of the sleeve 14 and spindle 13 also enable the bicycle and tender to round corners and execute other curved movements.

By means of the clamps 15ª and 16 the tender may be readily attached to and detached from the bicycle, and by means of the clamps 8 the tender-body 7 may be readily removed and replaced or substituted for, as desired.

In Figs. 3 and 4 I have shown a modified form of tender construction in which the supporting-wheel 6 is mounted upon an axle 5, journaled approximately intermediate of the ends of frame sides 21. Connected with each of said frame sides is a hinged body side 22, hinged thereto at 23. Connected with the frame sides 21 is a casing 24, which incloses the wheel 6 and is provided with an upwardly-directed partition 25, with which the sides 22 are adjustably connected by chains and eyes 26 and 27. The sides 22 may be folded into engagement with the casing 24 when the tender-body comprised thereby is empty.

I am aware that tenders have previously been provided for bicycles and similar vehicles; but I am not aware that such tenders have been constructed as is the subject of this invention, nor connected with the traction-vehicle in the manner hereinabove described.

Having fully described my invention, I claim as new and desire to secure by Letters Patent—

1. The herein-described tender for bicycles, comprising a main frame which supports the tender-body, a supplemental frame which is rigidly connected to the bicycle and two rigidly-connected connection devices, by means of which said main frame and said supplemental frame are connected and which respectively allow play of said tender-body vertically and laterally, substantially as shown and described.

2. The herein-described tender for bicycles, comprising a main frame which supports the tender-body, a supplemental frame, two connection devices by which said main frame and said supplemental frame are connected, each of said connection devices consisting of a sleeve, which sleeves are mutually rigidly connected at right angles relatively, and spindles turnably mounted in said sleeves and being fixed each to one of said frames whereby lateral and vertical play of said main frame are insured, substantially as shown and described.

3. The herein-described tender for bicycles, comprising a main frame which supports the tender-body, and a supplemental frame pivotally connected therewith, said supplemental frame comprising two loop-shaped members adapted to surround the rear wheel of a bicycle and provided with means for securing the same to the frame of the bicycle, substantially as shown and described.

4. The herein-described tender for bicycles, comprising a main frame, which supports the tender-body, and a supplemental frame pivotally connected therewith, said supplemental frame being composed of two parallel loop-shaped members which surround the rear wheel of the bicycle, each of said members being provided at its forward end with a clamp, and at each side with a clamp whereby said supplemental frame may be rigidly secured to the bicycle, substantially as shown and described.

5. The herein-described tender for bicycles, comprising a main frame provided with a supporting-wheel, and a tender-body and a supplemental frame comprising two parallel loop-shaped members, said loop-shaped members being provided with means for detachably connecting the same with the frame of a bicycle, two sleeves rigidly connected together and arranged relatively at right angles, a spindle by which said members of said supplemental frame are connected at their rearmost ends, and which spindle is passed turnably through one of said sleeves, and said main frame being provided at its foremost end with a spindle which is passed turnably through the other of said sleeves, substantially as shown and described.

6. A tender for bicycles and similar vehicles, comprising a frame, a support-wheel journaled therein approximately centrally thereof, and a tender-body comprising a central casing within which said drive-wheel operates, and provided with an upwardly-directed partition, and side members pivoted to said frame and adjustably connected with said partition, substantially as shown and described.

In testimony that I claim the foregoing as my invention I have signed my name, in presence of the subscribing witnesses, this 26th day of January, 1900.

CHARLES H. STONEBRIDGE.

Witnesses:
F. A. STEWART,
C. C. OLSEN.